United States Patent [19]

Wilson, Sr.

[11] Patent Number: 4,477,283

[45] Date of Patent: Oct. 16, 1984

[54] PROCESS AND APPARATUS FOR PRODUCING HYDRAULIC CEMENTS

[75] Inventor: Eddie K. Wilson, Sr., 8284 Dogwood Rd., Germantown, Tenn. 38138

[73] Assignee: Eddie K. Wilson, Sr., Memphis, Tenn.

[21] Appl. No.: 497,251

[22] Filed: May 27, 1983

Related U.S. Application Data

[63] Continuation-in-part of Ser. No. 285,452, Jul. 21, 1981, Pat. No. 4,388,117, which is a continuation-in-part of Ser. No. 165,500, Jul. 3, 1980, abandoned, which is a continuation-in-part of Ser. No. 947,599, Oct. 2, 1978, Pat. No. 4,213,791, which is a continuation-in-part of Ser. No. 690,510, May 27, 1976, abandoned.

[51] Int. Cl.$^3$ .............................................. C04B 7/46
[52] U.S. Cl. .................................... 106/100; 432/13
[58] Field of Search ................... 106/100, 314; 432/13

[56] References Cited

U.S. PATENT DOCUMENTS

| | | | |
|---|---|---|---|
| 3,303,037 | 2/1967 | Klein | 106/314 |
| 3,666,515 | 5/1972 | Nakagawa | 106/314 |
| 3,801,345 | 4/1974 | Nakagawa | 106/314 |

*Primary Examiner*—James Poer
*Attorney, Agent, or Firm*—Gravely, Lieder & Woodruff

[57] ABSTRACT

A process and apparatus for producing hydraulic cements such as portland cement utilizing electrical energy as the heat source is described. The electrical heat source includes a plasma arc torch operating in the transferred mode. A feature of the apparatus and process is in utilizing a liner within the furnace composed of a material having substantially the same chemical composition of the cement that is to be produced in the furnace. Preferably the feed materials properly proportioned to have the desired constituency of cement are fed below the melt of the furnace. The process is compact and efficient relative to the conventional rotary kiln used for producing cement.

16 Claims, 15 Drawing Figures

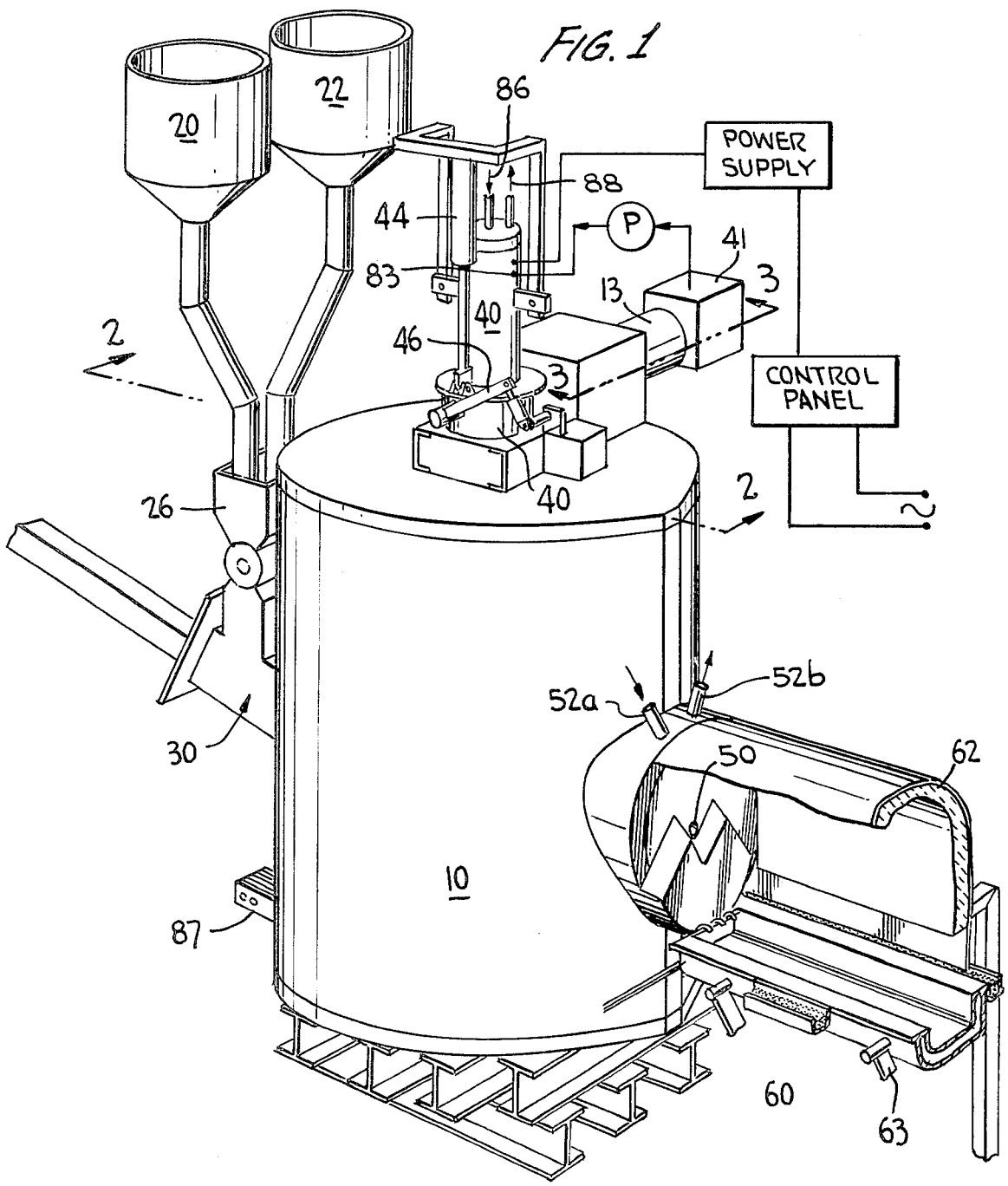

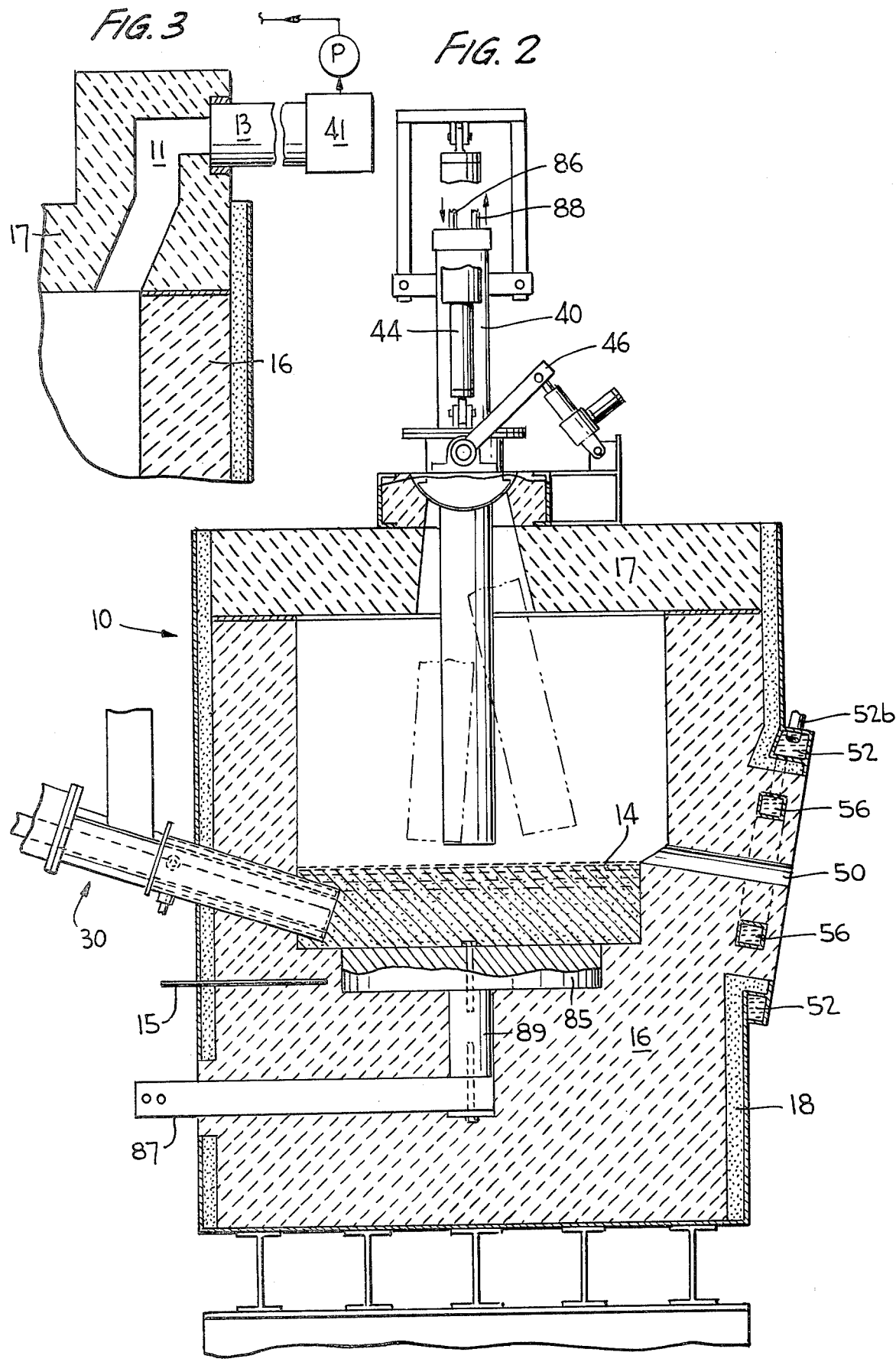

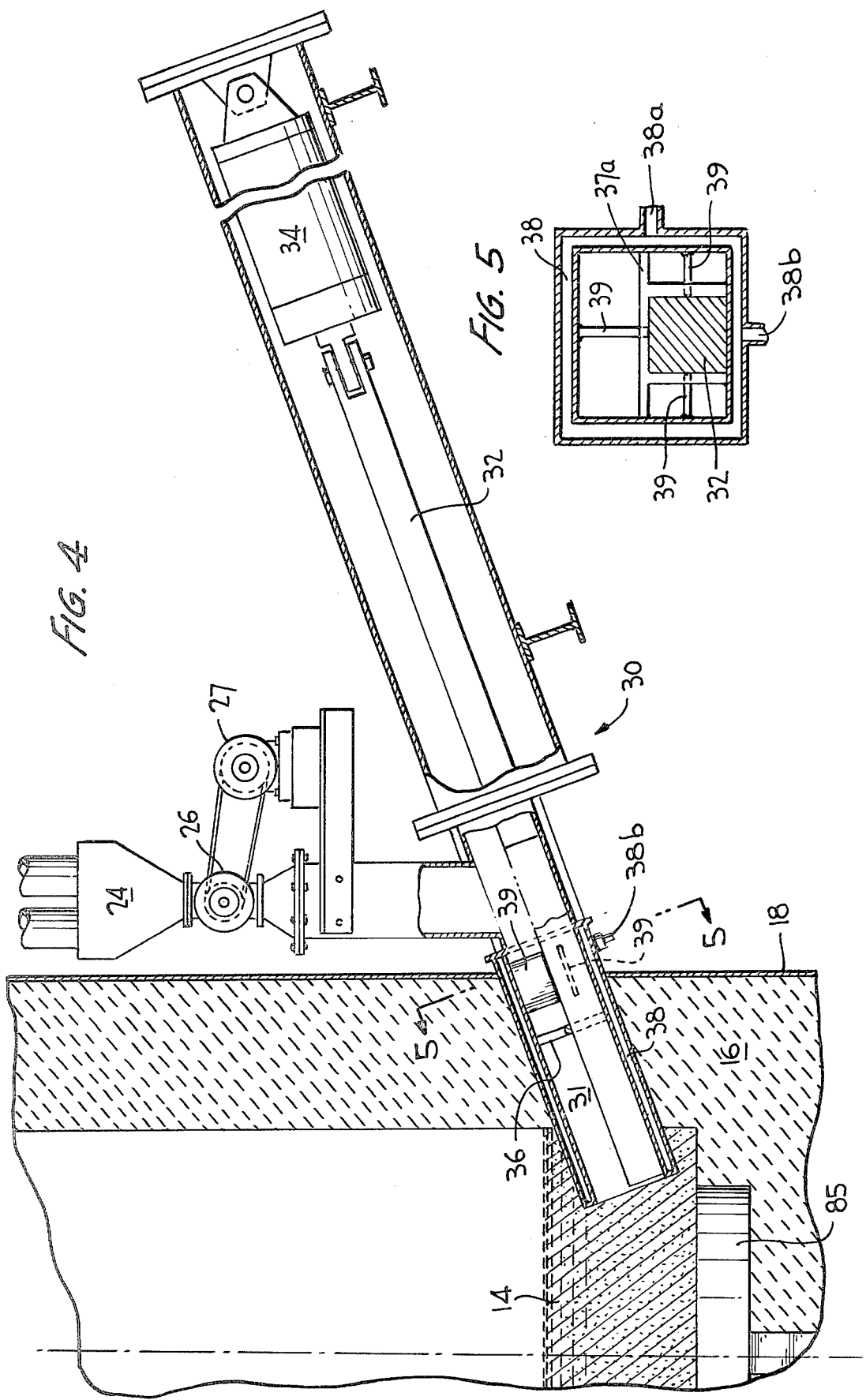

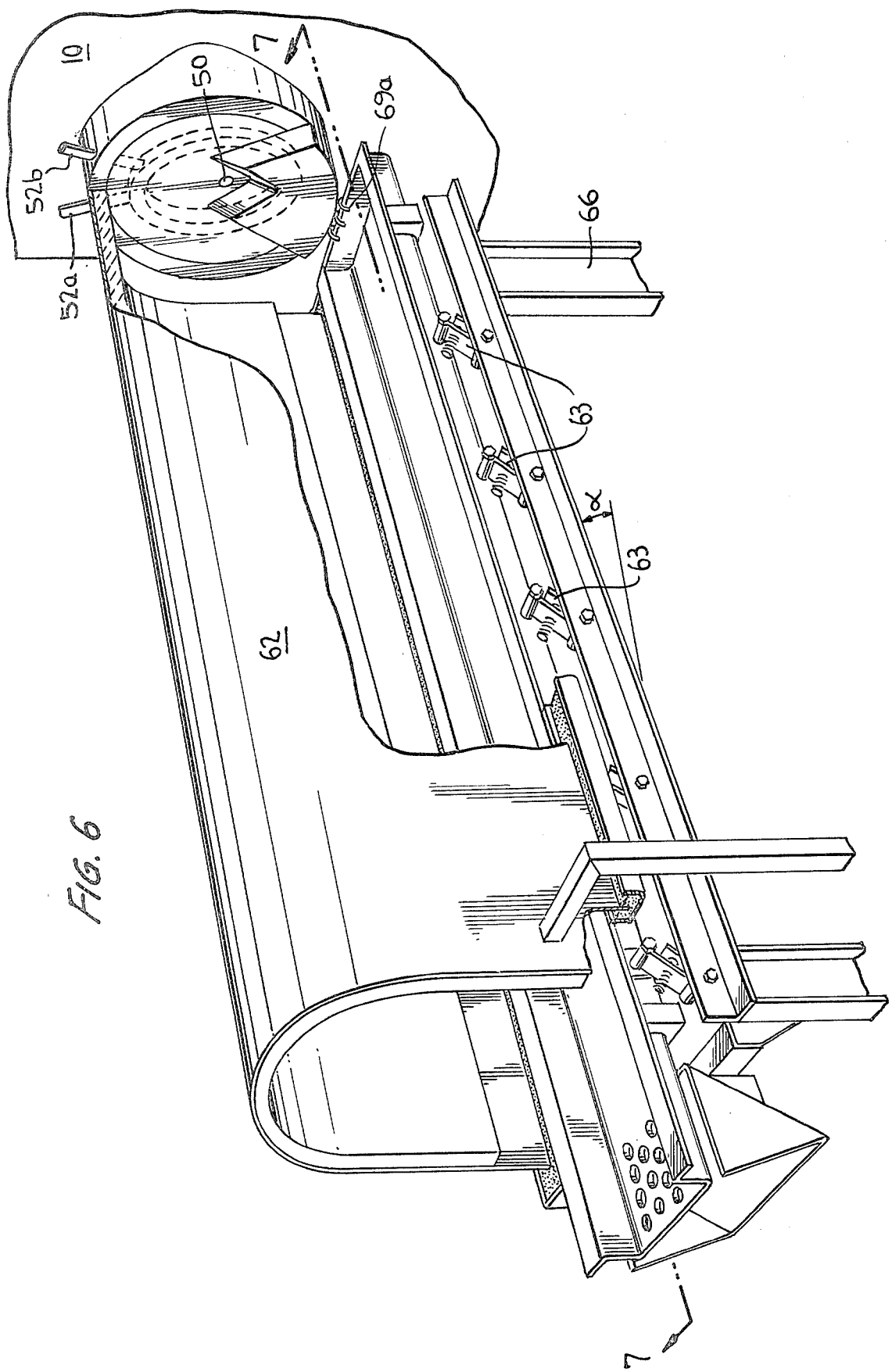

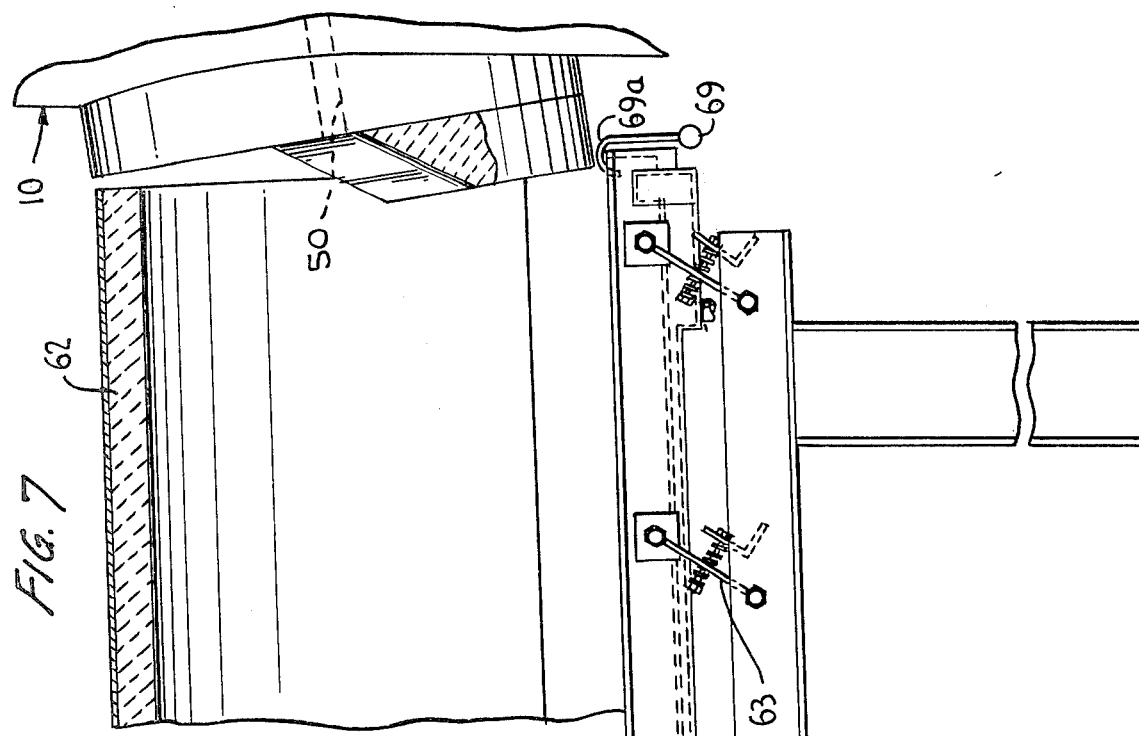
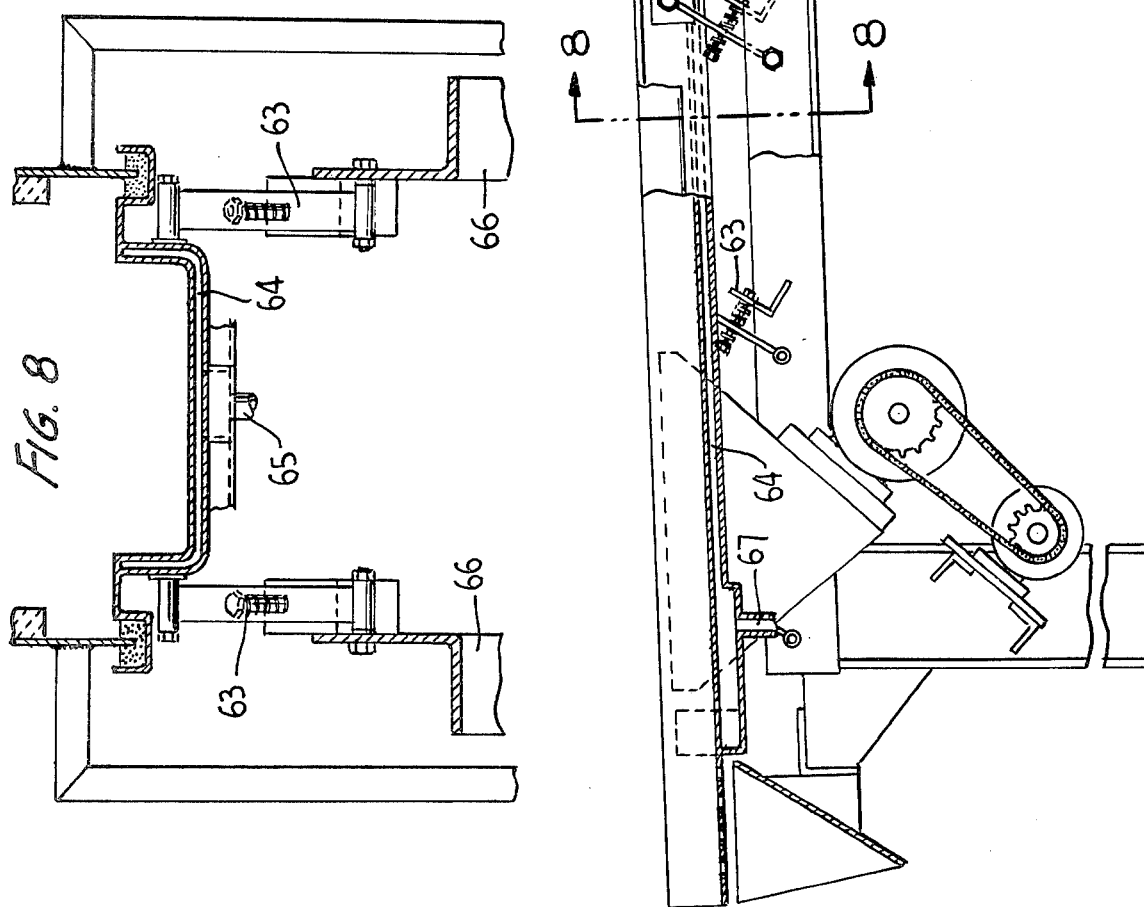

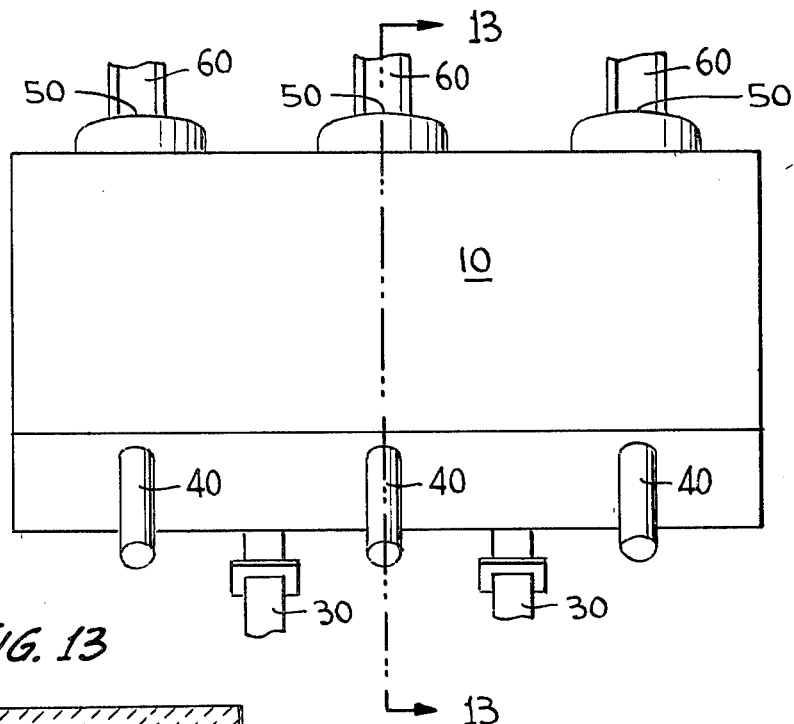
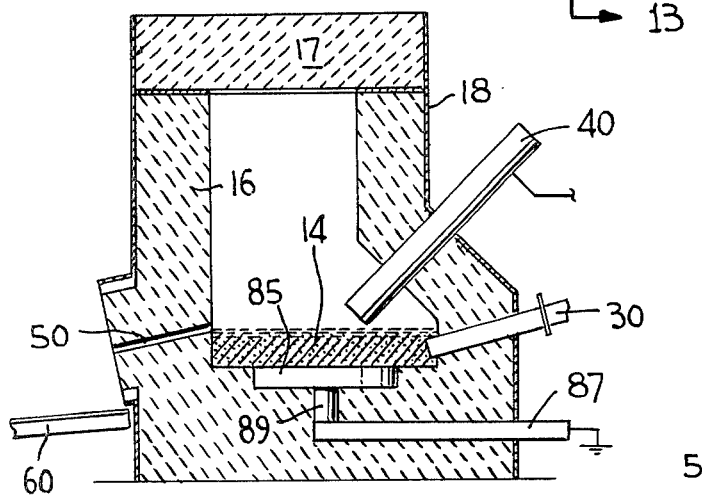
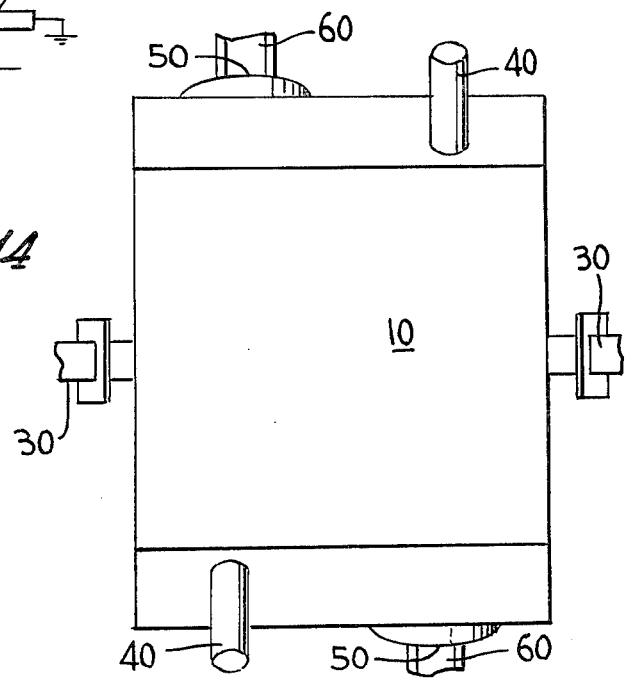

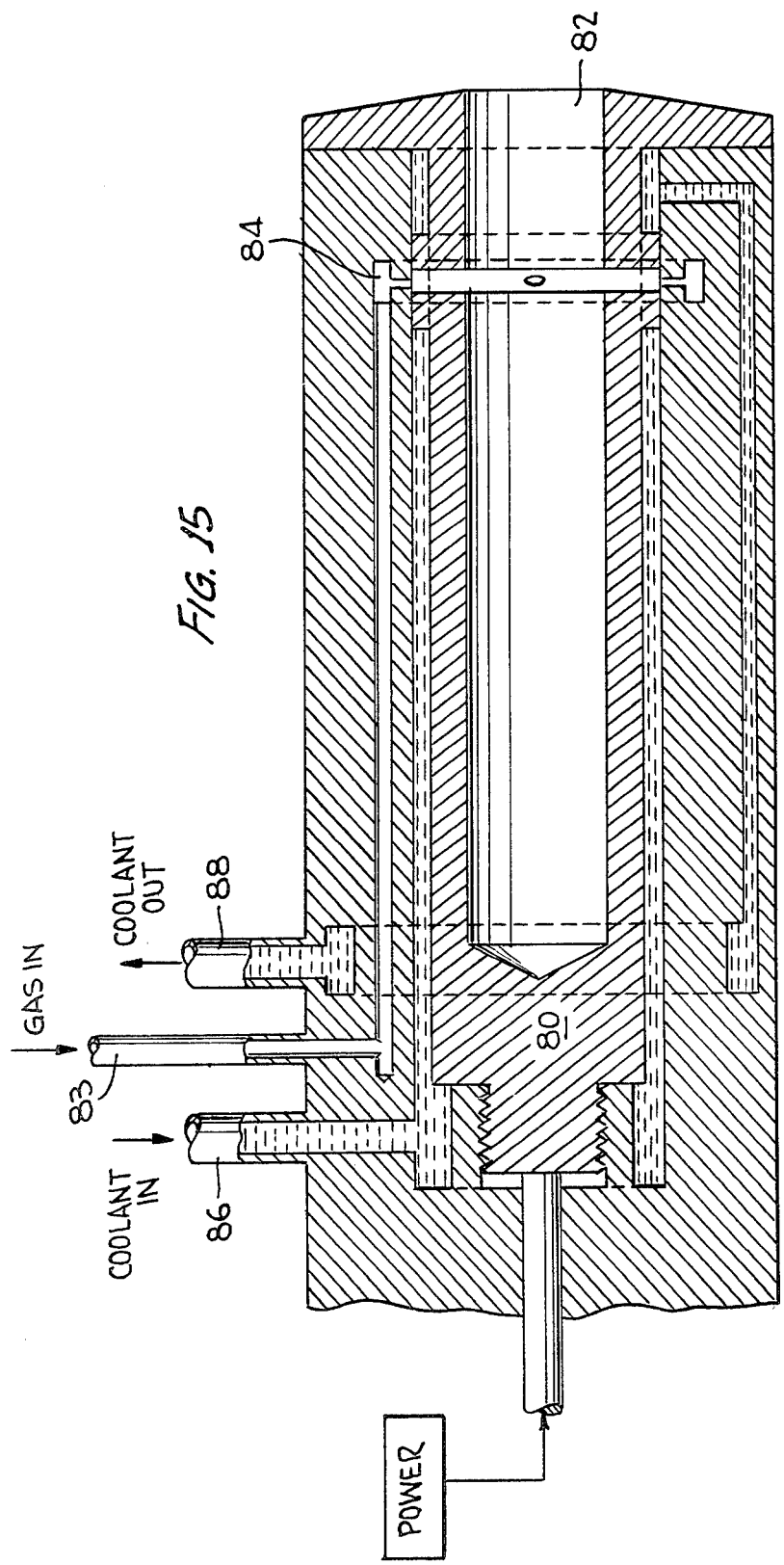

PROCESS AND APPARATUS FOR PRODUCING HYDRAULIC CEMENTS

RELATED APPLICATIONS

This application is a continuation-in-part of copending application Ser. No. 06/285,452 filed July 21, 1981, now U.S. Pat. No. 4,388,117, which in turn is a continuation-in-part of Ser. No. 165,500 filed July 3, 1980, now abandoned; which is a continuation-in-part of application Ser. No. 947,599, filed Oct. 2, 1978, now U.S. Pat. No. 4,213,791, which in turn is a continuation-in-part of application Ser. No. 690,510, filed May 27, 1976, now abandoned.

FIELD OF INVENTION AND BACKGROUND

This invention relates to a process and apparatus for producing portland and other hydraulic cements, and more particularly to a process and apparatus for the making of such cements utilizing electrical energy.

The hydraulic cements have long been recognized as an important group of cementing materials which are used principally in the construction industry. These cements have the special property of setting and hardening under water. The essential components of the cements are lime (CaO), silica ($SiO_2$), alumina ($Al_2O_3$), and the compounds derived therefrom. In the presence of water, these compounds react to form, ultimately, a hardened product containing hydrated calcium and alumina silicates. The hydraulic cements include portland cement as well as high alumina cement, hydraulic lime, and other lesser known cements.

Of all the hydraulic cements, portland cement is by far the most important. Portland cement is a major construction material that is utilized in practically all concrete as well as in most of the masonry mortars. The principal components of portland cement are tricalcium silicate ($3CaO.SiO_2$), dicalcium silicate ($2CaO.SiO_2$), and tricalcium aluminate ($3CaO.Al_2O_3$), all of which, when in a ground or powdered condition, will react with water to form a hard, stone-like substance held together with intermeshed crystals. Other compounds, such as magnesium oxide (MgO) and tetracalcium aluminoferrite ($4CaO.Al_2O_3.Fe_2O_3$), which are present in portland cement, do not exhibit any cementitious properties. The exact composition of portland cement is defined in A.S.T.M. Standard Specifications which are accepted by the industry.

Portland cement in most plants producing the cement is obtained by finely intergrinding lime and silica containing materials and heating the mixture within a rotary kiln to the point of fusion. Fusion occurs at or about 1290° C., the precise temperature depending upon the chemical composition of the feed materials and the type and amount of fluxes that are present in the mixture. The principal fluxes are alumina ($Al_2O_3$) and iron oxide ($Fe_2O_3$), and these fluxes enable the chemical reactions to occur at relatively lower temperatures. Normally the lime is obtained from natural calcareous deposits such as limestone, marl, and aragonite. Under certain conditions, lime may be derived from industrial by-products such as phospho-gypsum, a pulverulent calcium sulfate which may be obtained from the manufacture of phosphoric acid. The silica and fluxes, on the other hand, are normally derived from natural argillaceous deposits such as clay, shale, and sand.

More specifically, to manufacture portland cement, an argillaceous material and a calcareous material are crushed, mixed, and interground to a fine power, with the proportions of the two materials and the composition of each being maintained within narrow limits. The mixture passes into the upper end of a rotary kiln where it is heated eventually to the fusion point. However, before this point, water and carbon dioxide are driven off. As the hottest region is approached, a part of the interground mixture of materials melts and chemical reactions take place between the constituents of the raw mixture. In the course of these reactions new compounds are formed. After passing the hottest region, the compounds fuse and form a clinker. The clinker then is discharged into some form of a cooler. When cool, the clinker is mixed with a carefully controlled quantity of gypsum, and the mixture is ground to a very fine powder. That finely ground powder is the portland cement of commerce.

Rotary kilns vary in length and diameter. They revolve slowly (one turn in every one to two minutes or more) and, as they are slightly inclined, the charge slowly travels downwardly toward the hot end of the kiln. Being heated from its lower end, a rotary kiln develops its hottest temperatures in a rather narrow zone of the kiln, with the temperature becoming progressively lower toward the upper end. At no time does the entire mixture in the rotary kiln, even in the hottest zone, become molten, Special refractories are required, especially for the hot zone at the lower end, and once the kiln is fired it must remain in operation continuously, otherwise the expensive refractory will be damaged by thermal shocks upon cooling and reheating. Attempting to operate a rotary kiln above its normal operating temperature range will result in a high percentage of the feed mixture becoming liquid at one time and running uncontrollably out of the kiln. It will also cause severe damage to the refractories, to the kiln shell, and to the clinker cooler.

Generally, a rotary kiln is heated by burning a fossil fuel at its lower end, with the hot combustion gases traveling up the kiln. Heat energy is transferred to the downwardly moving raw feed by direct contact and indirectly by heating the refractory lining. As the raw materials become dried, heated, and partly calcined by the hot gases, some of the finer particles are picked up and transported out of the kiln as kiln dust.

The kiln dust usually contains some alkalies, primarily in the form of compounds of sodium and potassium, for they are usually found in the raw feed and also in coal which is used as a fuel. Also the raw feed and fuel often contain sulfur which volatilizes and enters the gas stream where it usually combines with lime and alkalies to form sulfates. The kiln dust is initially returned to the kiln, but eventually its alkali or sulfate level becomes so great that it is not suitable for manufacturing cement and must be discarded. This presents a disposal problem. Those sulfur compounds that do not combine with alkalies or lime leave with the flue gases. If sulfur alkalies or other particulate matter are sufficiently high in quantity, the flue gas stream may become environmentally unacceptable and require treatment to meet emission standards.

In short, the rotary kiln process commonly employed for manufacturing portland cement requires a large capital investment, and is not a thermally efficient apparatus, Furthermore, the kiln must remain heated, once it is fired, and remain operational unless shut down in a predetermined manner since the thermal shocks encountered upon cooling will damage its refractory and shell which is quite expensive.

In related U.S. Pat. No. 4,213,791 there is described a method of producing portland and other hydraulic cements in an electric furnace, thereby eliminating the need for a rotary kiln. An important feature of the process described in U.S. Pat. No. 4,213,791 is the ability to utilize a wide variety of feed materials including naturally occurring calcareous and argillaceous materials, as well as by-products from industrial processes, irrespective of whether those materials are in a molten or a pulverulent or non-pulverulent solid state. Plants utilizing the concept of the aforesaid patent are substantially less costly than a conventional rotary kiln and can be considerably sized down, permitting plants to be constructed in locations closer to the point of use of the cements and, thus, reducing shipping costs. Additionally, plants using the process of the type described in U.S. Pat. No. 4,213,791 can be interrupted to the extent that it is completely shut down without damaging equipment used in the process. In addition, it affords the opportunity to select the most energy-efficient drying, preheating, and calcining apparatus available that best suits the raw cement feed materials.

It has been determined that in practicing the process described in the aforesaid U.S. Pat. No. 4,213,791, a substantial advantage is obtained if the furnace is lined with a lining material having substantially or the same composition of the desired cement. Specifically, in a preferred practicing of the process as generally defined in the 4,213,791 patent, a melt is maintained within a cavity within the furnace which is lined with the desired cement, with the melt having substantially the same chemical composition as the desired cement. Appropriate feed materials are introduced into the cavity with the feed material being proportioned to, upon combining chemically, produce the desired cement. The melt is heated within the cavity sufficiently to enable the materials to liquefy and chemically combine within the melt, with the heating being effected by electrical energy. Melt is periodically or continuously withdrawn from the cavity and cooled. Cooling of the withdrawn melt is controlled to solidify it into a substance that has the chemical constituency and properties of the desired portland or hydraulic cement. This improvement is specifically described in copending application Ser. No. 06/285,452 as is a furnace having a shell and the filling of the shell with a filling having substantially the same chemical composition as the cement, a skull in the filling, and means for producing sufficient heat within the skull to maintain a melt having the chemical composition of the desired cement.

Additional improvements and preferred embodiments in the process described in U.S. Pat. No. 4,213,791 have now been discovered and developed. These improvements include (1) the nature in which the melt is withdrawn from the furnace and cooled to consistently provide a hydraulic cement having the desired constituency;

(2) the manner in which the raw material to produce the cement is fed into the melt as maintained within the furnace;

(3) the apparatus and manner in which the melt is electrically heated, including the particular manner in which the plasma arc torches used in the preferred embodiment of the process are mounted within, and on the furnace;

(4) the manner in which the lining within the furnace is provided and maintained, including in conjunction with the volume and ratio of the raw materials being fed to the furnace;

(5) the manner in which the ratio of feed materials is fed to the furnace to maintain the proper proportions of calcium and silica within the melt which ultimately forms the cement having the desired composition; and (6) the manner in which a gas for use in the particular electric torches is produced within the system and ultimately fed to the torches so as to avoid noxious gases being passed to the atmosphere.

These and other advantages will be apparent from the following detailed description with emphasis being directed to the accompanying figures of the drawing which form a part of the present specification and wherein like numerals and letters refer to like parts wherever they occur.

In the drawing,

FIG. 1 is a perspective view of the overall apparatus;

FIG. 2 is a cross-section of the furnace along line 2—2 of FIG. 1, parts being omitted;

FIG. 3 is a broken-away cross-section generally along line 3—3 of FIG. 1 showing in greater detail the gas outlet;

FIG. 4 is a view partially in section showing the feed ram;

FIG. 5 is a sectional view along line 5—5 of FIG. 4 showing the spider means in greater detail;

FIG. 6 is a perspective view partially in section of the discharge chute of the furnace;

FIG. 7 is a partially broken-away sectional view taken along line 7—7 of FIG. 6 of the discharge chute;

FIG. 8 is a sectional view taken along line 8—8 of FIG. 7;

FIG. 12 is a view from the top of a modified furnace having a plurality of torches, feeders, and tap-holes;

FIG. 13 is a sectional view along line 13—13 of FIG. 12;

FIG. 14 is a plan view of an alternative embodiment of the furnace; and

FIG. 15 is a simplified cross-sectional view of a plasma arc torch which operates in the transferred mode.

Figure 9:
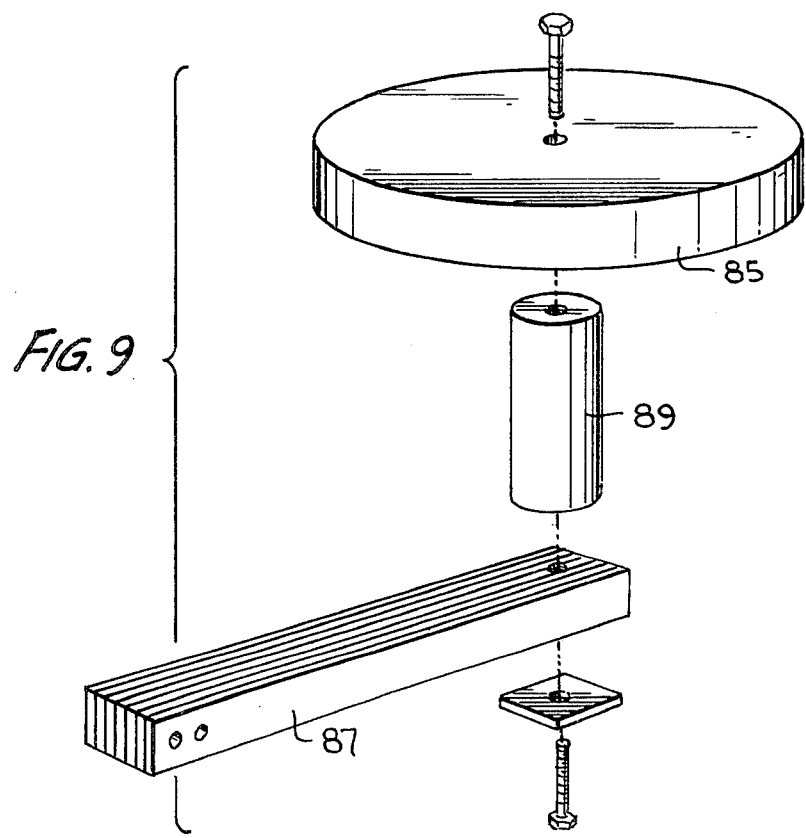
FIG. 9 is an exploded view of the ground plate and connector means for the furnace.

Since portland cement is the most significant of all hydraulic cements, the process will be described as it applies to the production of portland cement. It should be recognized, however, that by varying raw materials and proportions, other hydraulic cements may be produced.

In start-up of the plant, raw materials are fed to the furnace in controlled proportions in order to provide the components in the proper ratio necessary for the production of portland cement. The materials initially fed to the furnace are heated to form a melt within the furnace. As above noted, an important aspect of a preferred embodiment of the present process is to provide a melt which forms its own lining or skull within the furnace which serves as a refractory for protecting the furnace shell. In a preferred embodiment, therefore, the components are fed to the furnace in proportions to provide the chemical constituency necessary for portland cement and to form a lining or skull for the furnace shell.

Once the melt and skull are established in the furnace, the raw feed materials are continuously added to the melt in the proper proportions. Those raw materials may be molten or solid, and when in the solid form they may be pulverulent or nodular. Also, they may be at ambient temperature or they may be pre-heated or even pre-calcined. When nodular, the practical upper size limit is determine by design so that the nodules will not interfere with the operation of the furnace and its feed equipment. In this regard, the melt reaches high temperatures so that all materials introduced into it eventually reach a molten state.

One of the raw feed materials must include a source of lime, that is calcium oxide (CaO). A common and practical source of lime is limestone which contains primarily calcium carbonate ($CaCO_3$). When heated to about 900° C., this compound decomposes into lime (CaO) and carbon dioxide ($CO_2$), the latter of which, being a gas, can escape into the atmosphere or, as will be developed hereinafter, can be utilized in the process. The limestone can be preheated prior to its introduction into the furnace to drive off some or all of the carbon dioxide. Preheating places lesser electrical energy demands on the installation. While limestone is quite common, other naturally occurring calcareous materials also contain high quantities of calcium carbonate and are equally suitable for use as a raw feed material in the present process. Such materials include aragonite, chalk, marl, cement rock, or marine shells. Normally, naturally occurring calcareous materials are crushed to a nodular form for use in the process, but any fines produced in the crushing operation are also suitable as a feed material and are introduced into the melt along with the nodules, preferably after undergoing preheating and calcining so that lime is essentially the feed material that is introduced.

The by-products of various industrial processes are also suitable for use as the source of lime. For example, certain tailings from flue gas scrubbers contain a considerable amount of lime. Also suitable is kiln dust which is normally collected from conventional cement kilns and is high in alkali and sulfur content. Phospho-gypsum or naturally occurring gypsum, which is essentially calcium sulfate ($CaSO_4$), can also be used as a source of the lime, but suitable means for disposing of the sulfur trioxide ($SO_3$) gas should be available, e.g., sulfuric acid or elemental sulfur production.

The raw feed materials must also include a source of silica ($SiO_2$). A suitable source for solid silica is certain naturally occurring argillaceous materials such as clay, shale, slate, and sand. These solid materials are easily reduced to fines or nodules, if not already in that state, and are introduced into the melt as such, whether at ambient temperature or preferably preheated. Certain fly ash and also coal ashes have a high proportion of silica and can be introduced into the melt as is or preheated.

Another source of both lime and silica is calcium silicate ($CaO.SiO_2$) which is found in slag derived from many industrial processes. For example, the blast furnaces used in producing steel produce a large amount of slag. The same is true of certain processes used to extract phosphorus from calcium phosphate rocks and other processes used to smelt chromium ore. The slag is, of course, initially in a molten state and, as such, is usually poured out to produce a slag heap which grows larger and larger. Heretofore, little use has been found for the slag and, as a consequence, it merely accumulates. The slag may be broken up into a granular or nodular consistency and after proper proportioning with other sources of lime or silica be introduced as such into the melt within the furnace.

The energy requirements of the cement-making process may be reduced substantially if the slag is introduced into the electric furnace in its initially molten condition. In this regard, calcium silicate melts at about 1300° C., and a considerable amount of heat is required to calcine the calcareous portion and to elevate the calcium silicate to that temperature. This is possible provided the cement-making facility is in close proximity to the industrial process from which the slag is derived. Because the furnaces necessary for the present process are relatively small and of low cost in comparison to a conventional rotary kiln installation, this is possible.

The raw feed materials, in addition to including a source of lime and a source of silica, may also include a source of alumina, that is aluminum oxide ($Al_2O_3$), although the amount of alumina that is useful is considerably less than the amount of lime or silica. Silica and alumina are often found together in nature as well as in the slag-type by-products of many industrial processes, so more often than not the source of silica will likewise serve as the source of alumina.

Additionally, the feed materials may contain a flux to lower the temperature at which the desired chemical reactions will occur within the melt of the furnace. To some extent the alumina functions as a flux as well as an important cement compound. Another common flux is iron oxide ($Fe_2O_3$), which like alumina is found in many argillaceous substances as well as slag-type industrial by-products, and is also useful in absorbing any excess lime in cement mixes.

Other materials often appear in minor quantities in the various feed materials. These include, but are not limited to the compounds of the alkalies, sodium and potassium, and of sulfur, titanium, magnesium, manganese, phosphorus, barium, and strontium. If present in excessive quantities, they may be harmful to the cement product. This is particularly true of the alkali and phosphorus compounds.

Within the melt of the furnace the feed materials combine chemically so that the melt when withdrawn and cooled will have adequate proportions of tricalcium silicate ($3CaO.SiO_2$), dicalcium silicate ($2CaO.SiO_2$) and tricalcium aluminate ($3CaO.Al_2O_3$), and whatever other compounds are necessary for the desired cement. In this regard, the chemical constituency of the feed materials must he known and the feed materials must be proportioned such that the melt within the electric furnace acquires the chemistry necessary for the desired portland or other cements. Normally, proportioning is achieved by metering or weighing the feed materials before feeding into the furnace. Although the feed materials may contain compounds in addition to the lime, silica, and alumina, many of these evolve as gases during preheating or under the intense heat of the furnace. For example, when calcium carbonate ($CaCO_3$) is the source of lime and the carbonate is not calcined in a separate apparatus, the electric furnace may be used to drive off the carbon dioxide ($CO_2$), leaving lime (CaO). The electric furnace is particularly effective in volatilizing alkali, phosphorus, and other compounds in the feed materials because of the concentrated high heat in the melt, usually leaving only trace amounts of these compounds in the final product, and these amounts are acceptable. Also, the compounds driven off are subject to easy and econmical recovery. Other non-cementious compounds can appear in the final product, and they do not significantly affect the cement. Free lime should be maintained at a minimum and within acceptable limits.

As previously stated, in a preferred embodiment of this invention, the melt within the furnace is contained within a skull formed from the same material as the melt itself. The skull serves as the actual refractory lining for the furnace. Thus, the melt protected by the skull and formed from the same material will not permit the melt to be contaminated by the refractory lining or cause damage to the refractory lining. In this regard, conventional refractory brick contains magnesium and other elements which, if introduced into the melt, would detract from the quality of the cement that is produced. The melt in view of its extremely high temperature, which may approach 1650° C. but is usually nearer 1500° C. depending on the feed materials, will at times react with known refractory materials. The result would be an erosion of the refractory materials and a contamination of the melt. Not only does the skulling avoid the erosion and contamination problems that would result from the formation of the melt against conventional refractory materials, but it further eliminates the start-up and shut-down problems associated with conventional refractories. Once the refractory lining of a conventional cement kiln is brought up to the operating temperature for the kiln, the kiln cannot be cooled down without the risk of damaging the refractory lining, for conventional refractory materials will not withstand the repeated thermal shocks that accompany cooling and reheating from the extremely high temperature required for the production of portland cement.

If one or more of the feed materials are pulverulent, it will be necessary to control the feed rate to prevent a heat sink forming in areas of the melt because of the rapid heat-transfer characteristics of the fine particle sizes involved.

Whenever the chemical constituency of the feed materials is such that excessive amounts of unvaporized alkalies, sulfates, or phosphates are present, the furnace is equipped with a roof and an exhaust system so that those gases evolving from the melt can be condensed and collected. Other gaseous compounds can be absorbed by other methods for recovery or disposal simultaneously. This removes any environmentally unacceptable materials from the evolved gases before they are vented to the atmosphere.

It is within the region of the homogeneous melt that the furnace is tapped. The melt which is withdrawn in a controlled manner is allowed to cool into a clinker. The cooling must be controlled to ensure proper compound formation, yet rapid enough to prevent the dicalcium silicate in the beta phase from changing to the gamma phase. The latter crumbles or "dusts" and is not cementitious.

The heat that is extracted from the clinker at the cooler can be collected and re-utilized. For example, the collected heat can be transferred to a preheater where it serves to preheat the feed materials that pass through the preheater. This is best achieved by directing heated air discharged from the cooler into the preheater. Or, it may be used as preheated combustion air if a fossil fuel energy source is used to preheat the feed materials.

The clinker upon leaving the cooler is either shipped to a purchaser or stored. Ultimately, the clinker is crushed and ground to a fine powder which is suitable for use as cement.

The general nature of the process and apparatus of the present invention will now be described with reference to FIG. 1 of the drawing. As illustrated in FIG. 1, the apparatus comprises a furnace 10 utilizing a plasma arc torch. The furnace is configured in such a manner to enable an operator to observe directly or electronically the tap-hole, as will be described later, as well as the plasma arc torch, which also will be described later. In a preferred embodiment, where the raw materials are solids, they are fed from overhead by the required number of supply bins, for example bins 20 and 22 to feeder 26 in proper proportions to provide the essential chemical constituency of portland cement. A proportioned supply of raw materials is charged to the interior of the furnace by feed ram means 30 below the melt, also as will be described more fully hereinafter with reference being specifically made to FIGS. 4 and 5 of the drawing.

The heat for forming and maintaining the melt within the furnace is provided by plasma arc torch 40 designed to operate in the transferred arc mode. These torches are described generally in Camacho, U.S. Pat. No. 3,673,375 and Baird, U.S. Pat. No. 3,194,941. The torches and their manner of operation in the environment of the present invention also will be described more fully hereinafter with reference being specifically made to FIGS. 2, 9, and 15. The melt, after attaining the chemical constituency of the desired cement which is almost an instantaneous reaction, is discharged from the furnace through tap-hole 50 onto a cast iron conveyor 60 where the melt undergoes controlled cooling to provide a cement having the desired chemical constituency.

Reference will now be made to the specific essential parts and components of the apparatus. Referring to FIG. 2, the interior of the furnace includes the melt 14, liner or skull 16 which has the same chemical constituency as the melt, and furnace shell 18 constructed of steel. The liner or skull can be the sole liner of the furnace. However, at times it may be preferable to have relatively thin conventional refractory lining adjacent the furnace shell for start-up purposes. The roof 17 of the furnace, which is also lined with a refractory but not necessarily of the same constituency as the melt, is preferably maintained approximately five feet above the melt. It has been discovered that the distance between the melt and the roof of the furnace is relatively critical in that the distance must be sufficiently great to permit metal oxides, such as ferric oxide, to cool and condense before reaching the roof line. If not, the uncondensed ferric and the like oxides will cause damaging corrosion to the roof refractory which, in turn, will adversely affect the composition of the cement.

Moreover, sensor 15 is positioned within the refractory lining which has the same constituency as the melt. The sensor in the liner is used as a means to maintain and control the thickness of the liner. If the temperature, as indicated by the sensor, increases above a critical level where the liner will commence to dissolve due to such high temperature, or if the temperature decreases to the extent that the liner will continue to build and, thus, detract from the size of the melt cavity, corrective action will be taken. The sensor, in a preferred embodiment, can be tied into the furnace feed means. If the sensor indicates that the liner is too hot, the feed will be increased; thus effectively cooling the melt and liner. If the sensor indicates that the liner is too cool, the feed can be decreased; thus effectively increasing within a short interval the temperature of the melt and, thus, the liner. Alternatively, the sensor can call for the flow of cooling water or the like means through a suitable jacket between the furnace shell 18 and liner 16, not shown, to either increase or decrease the temperature of the lining.

As also illustrated in FIG. 2, the raw materials, properly proportioned to provide the constituency of portland cement, are fed by ram means 30 to the melt 15 intermittently, or substantially continuously, below the melt line. Although it is possible to feed the raw materials at the surface of the melt, it has been found advantageous and preferable, particularly when feeding finely divided materials, to feed the raw materials below the melt line; thus avoiding undesirable consequences including plugging of essential passages in the plasma arc torches when used as the source of heat, or otherwise eliminating problems due to the accumulation or settling of the finely divided raw materials in areas where they are not desired and detrimental. The details of the mechanism for feeding below the surface is best illustrated in FIGS. 4 and 5. Referring to FIG. 4, the feed material is fed from supply bins 20 and 22 to feeder 26, powered by a conventional electrical motor 27, to ram mechanism 30. The ram mechanism includes air- or hydraulic-actuated means 34 which actuates and drives ram 32. The ram 32 drives feed material delivered from feeder 26 into the melt 14 periodically as required to maintain the correct feed rate. It has been determined that it is possible, and at times desirable, to control the ratio of feed materials delivered into the melt based on the electrical resistivity of the melt. Thus, it has been established that the electrical resistivity of the melt is directly proportional to the ratio of calcium and silica in the melt. If the electrical resistivity changes from a permissible plus or minus level, the mix of calcium feed to silica feed is automatically adjusted within the feed system to accommodate for the change in resistivity. Another method to control the quality of the mix can be facilitated by including an on-line x-ray test mechanism, not shown, which will test for and modify the ratio of calcium to silica feed material which is introduced into the melt.

Referring again specifically to ram mechanism 30, there is included in the mechanism a spider means 36. As best shown in FIGS. 4 and 5, the ram 32 of the ram mechanism 30 is substantially smaller in size than feed passage 31. This has been found desirable to avoid jamming. The spider means 36, positioned within passage 31, includes horizontal and vertical web members or vanes 37 and 37a, with the ram 32 passing through an opening in the web as shown in FIG. 5. The ram 32 drives the charge fed from feeder 26 into the melt and, upon return, vanes 37 and 37a "clean" the ram of solidified melt, thus facilitating the next intermittent charge. Alignment members 39 are provided to maintain alignment of ram 32 with spider means 36. As also best shown in FIG. 5, the feed passage 31 is water-cooled. Water passes through inlet 38a to a water passage 38, and is removed through outlet 38b. As shown in FIGS. 1, 2, and 4, the ram mechanism is positioned at an inclined angle to the melt. This is highly advantageous in preventing the melt from backing up into the feeder, and in providing a smooth, continuous, and intermittent charging operation without jamming.

FIG. 2 further illustrates the plasma arc torch 40 used to provide the heat for the furnace. Thus, as shown in FIG. 2, the torch 40 is raised and lowered in relation to the furnace through mechanism 44. The torch within the furnace can be moved using the mechanism generally designated 46 in combination with mechanism 44 in order to direct the torch within the furnace either toward the feed means 30, toward the tap-hole 50, or in a position therebetween.

Plasma arc torches are known, as previously stated, and do not constitute an essential part per se of the present invention. However, heretofore plasma arc torches have not been used in the manufacture of cements and are unique and useful in the presently disclosed process and apparatus. A simplified cross-section of a transferred arc torch is shown in FIG. 15 of the drawing for purposes of illustration. Referring to FIG. 15, the torch for operating in the transferred arc mode includes an electrode 80; a collimator 82; a vortex generator 84 for providing a feed gas; water input means 86 for cooling the torch mechanism, and a water output means 88 for withdrawing the circulating water. Gas input means 83 feeds gas to the vortex generator between electrode 80 and the collimator 82. Further included as essential parts of the plasma arc torch, as best shown in FIGS. 2 and 9, is a ground 85 which generally takes substantially the shape of the floor of the furnace for receiving the transferred arc from electrode 80; a means 87 for connecting the ground to the negative lead of the electrical power source for operating the torch, and separator means 89 interconnecting the ground 85 and means 87. In operation, the arc from electrode 80 is transferred to the ground 85. To the extent that the melt is sufficiently conductive, it will accept the electrical energy carried by the arc and allow the arc to reach the ground 85 and to the negative lead of the power supply, thus completing the electrical circuit.

The plasma arc torch requires in its operation water to cool the torch. As shown in FIG. 1, coolant water is supplied through water inlet 86 and discharged through water outlet 88. Additionally, gas must be supplied to the torch and specifically to vortex generator 84. The gas is ionized between the vortex generator and the collimator as commonly understood. Most commonly, plasma arc torches are fed with air as the vortex generator gas. However, in a cement-producing furnace, the amount of air required by the torch is substantial, producing -- in the event air is the vortex gas -- substantial $NO_x$ gases. These gases in the amount produced in an apparatus of the type essential in a cement-producing furnace can adversely influence the environment. Accordingly, as a preferred embodiment, the vortex generator gas is carbon dioxide produced insitu within the furnace as a result of not completely pre-calcining the lime feed which is fed to the furnace. Thus, carbon dioxide is produced within the furnace and, as best shown in FIG. 3, is removed through furnace outlet 11 and fed by conduit 13 to separator means 41. The carbon dioxide is then fed, after being pressurized in pump "P", to the vortex generator 84 of torch 40. Alternatively, in the event the torch is fed with air, the $NO_x$ gases are removed through conduit 13, separator means 41, and then fed to a suitable nitric acid producing facility, not shown.

Figure 10:
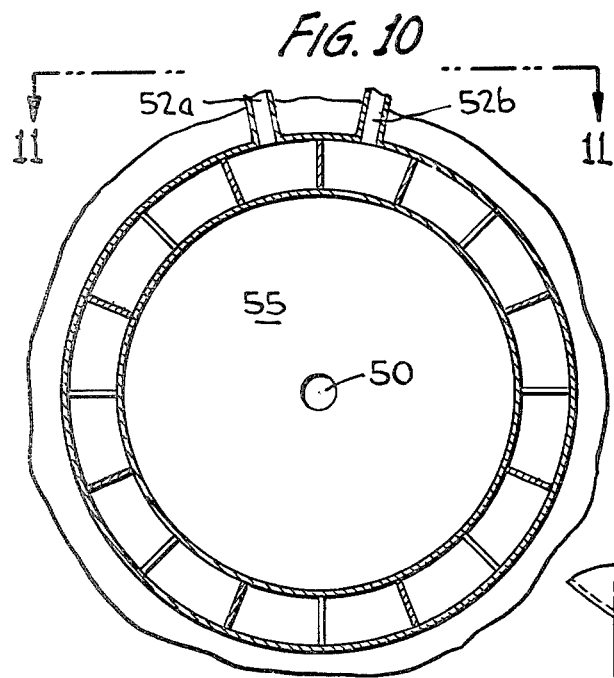
FIG. 10 is a sectional view of the water-cooled jacket around the tap-hole.
Figure 11:
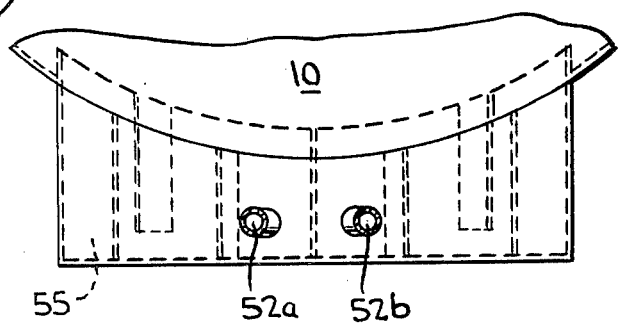
FIG. 11 is a plan view along line 11—11 of FIG. 10.

As also shown in FIG. 2, the furnace includes tap-hole means 50. It is essential that the tap-hole on the inside of the furnace be substantially at the level of melt 14 and preferably have a downward passage at an angle theta leading to a discharge end outside the furnace. The tap-hole formation and the maintenance of the tap-hole is critical to permit intermittent or continuous withdrawal of the melt having the proper chemical constituency of portland cement from the furnace. In order to maintain the tap-hole in its proper configuration, as best shown in FIGS. 1 and 2, the area around the tap-hole is built-up and includes water-cooled passages 52 and 56 surrounding the tap-hole. These water-cooled passages control and maintain the essential temperature necessary for continuously or intermittently withdrawing the melt. As shown, the water-cooling means 52 and 56 include inlets 52a and 56b and outlets 52b and 56b, respectively. The internal shape of the water-cooled passages are best shown in FIGS. 10 and 11 where only one such passage is shown. It is to be understood, however, that both passages have the same construction. As seen, the water passages include spaced baffles 55 and 55a which provide for a tortious water flow around the baffles, effecting efficient cooling.

The melt from tap-hole 50 is discharged to conveyor means 60 best shown in FIGS. 6, 7, and 8. Cast iron conveyor means 60 is independent of housing 62. Conveyor means 60 is vibrated with vibrator motor 64 on shaker spring means 63 in order to facilitate movement of the discharged melt from the head of the conveyor means 60 to the discharge end. The conveyor means, also to facilitate clinker discharge, is positioned on a frame 66 at a declining angle alpha. Conveyor means 60 is water-cooled through water passage 64. Water flows through inlet 65 and discharged through outlet 67. Controlled cooling is essential in order to provide clinkers having the proper crystal formation and having the proper chemical constituency of the desired portland cement. To further facilitate proper cooling and clinker growth, compressed air can be supplied through conduit 69 and fingers 69a at the head of conveyor means 60.

The furnace shown in FIG. 1 is of a relatively small capacity. Where the furnace capacity is to be enlarged, it is preferable to construct the furnace as shown in FIGS. 12 and 13. Thus, as shown, the essential components of the furnace of FIGS. 12 and 13 are the same as in the design of FIG. 1. However, the furnace is rectangular in shape and utilizes a plurality of plasma arc torches 40 mounted in the sidewalls of the furnace as opposed to being mounted in the roof of the furnace. Additionally, the furnace has a plurality of tap-holes 50 with the plasma arc torches positioned directly across from the tap-holes in order to facilitate directing the gun to the tap-hole as necessary to enhance tapping of the furnace. In the embodiment shown in FIGS. 12 and 13, the feed rams for feeding the feed material below the surface of the melt are positioned on the same side and below the torches 40.

FIG. 14 shows another modified design. The furnace of FIG. 14 is similar to that shown in FIG. 12; however, it is of smaller capacity and is substantially square in shape. Two plasma arc torches are utilized and positioned on opposite sidewalls of the furnace as are the tap-holes. A furnace of the type design shown in FIG. 14 can be beneficial in controlling the temperature of the melt within the furnace and facilitates tapping. The feed mechanisms 30 are not in the same walls as the tap-hole or plasma arc torches.

As shown in FIG. 12, the tap-holes are equipped with separate conveyor means 60. It is possible, however, to have a single conveyor extending the width of the furnace wall, with the plurality of tap-holes feeding into the single conveyor means.

As will be apparent to one skilled in the art, various modifications can be made within the scope of the aforesaid description. Such modifications being within the ability of one skilled in the art form a part of the present invention and are embraced by the appended claims.

It is claimed:

1. A process for producing a hydraulic cement, such as portland cement, said process comprising:
    maintaining a melt within a cavity that is lined with a material having substantially the same chemical composition as the desired cement, the melt also having substantially the same chemical composition as the desired cement, whereby the melt is not adversely affected by the material that lines the cavity;
    introducing appropriate feed materials into the melt below the upper surface of the melt within the cavity with the feed materials containing compounds suitably proportioned for the desired cement;
    heating the melt within the cavity sufficiently to enable the feed materials to be in a molten condition and to chemically combine within the melt, the heating being effected by electrical energy;
    withdrawing the melt from the cavity, and
    cooling the withdrawn melt to solidify it into a solid substance that has the chemical constituency and properties of the desired cement.

2. The process according to claim 1 wherein at least one of the feed materials is in a molten state.

3. The process according to claim 1 wherein the electrical energy is supplied from at least one plasma arc torch.

4. The process of claim 1 wherein the temperature of the liner is sensed, and the liner is controlled and maintained based on the sensed temperature.

5. The process of claim 4 wherein the feed material to the furnace is increased if the temperature of said liner is above a predetermined level and decreased if the temperature is below said predetermined level.

6. The process of claim 4 wherein the temperature of the liner is adjusted by heat-exchange means in the event the temperature is above or below a predetermined level.

7. The process of claim 1 wherein the electrical resistivity of the melt is monitored and in the event the resistivity falls outside a predetermined level the ratio of said feed materials is adjusted to again attain the said predetermined level of electrical resistivity.

8. The process of claim 3 including the step of feeding a feed material comprising calcium carbonate, forming carbon dioxide during the heating of the melt and said calcium carbonate feed material; collecting said carbon dioxide from above said melt and feeding said carbon dioxide to said plasma arc torch as the vortex generator gas.

9. The process of claim 5 wherein said plasma arc torch is fed with air as the vortex generator gas and $NO_x$ gases are recovered as a by-product and fed to a nitric acid producing plant.

10. A process for producing hydraulic cement, such as portland cement, said process comprising:

maintaining a melt within a cavity;

introducing appropriate feed materials into the melt within the cavity with the feed materials containing compounds suitably proportioned for the desired cement;

heating the melt within the cavity sufficiently to enable the feed materials to be in a molten condition and to chemically combine within the melt, said heating being effected with at least one plasma arc torch;

withdrawing the melt from the cavity, and cooling the withdrawn melt to solidify it into a solid substance that has the chemical constituency and properties of the desired cement.

11. The process according to claim 10 wherein the feed materials are introduced into the melt at the surface of the melt.

12. The process according to claim 10 wherein the feed materials are introduced into the melt below the upper surface of the melt.

13. The process according to claim 12 wherein the electrical energy is supplied by a plurality of plasma arc torches.

14. The process of claim 10 wherein the electrical resistivity of the melt is monitored and in the event the resistivity falls outside a predetermined level the ratio of said feed materials is adjusted to again attain the said predetermined level of electrical resistivity.

15. The process of claim 10 including the step of feeding a feed material comprising calcium carbonate, forming carbon dioxide during the heating of the melt and said calcium carbonate feed material; collecting said carbon dioxide from above said melt and feeding the carbon dioxide to said plasma arc torch as the vortex generator gas.

16. The process of claim 13 wherein said plasma arc torches are fed with air as the vortex generator gas and $NO_x$ gases are recovered as a by-product and fed to a nitric acid producing plant.

* * * * *